United States Patent [19]

Kuzarov et al.

[11] Patent Number: 5,153,996
[45] Date of Patent: Oct. 13, 1992

[54] RIVET CONNECTOR FOR HEDGE CUTTING BLADE

[75] Inventors: Encho J. Kuzarov, Milwaukie; Robert Penberthy, Gladstone, both of Oreg.

[73] Assignee: Blount, Inc., Portland, Oreg.

[21] Appl. No.: 804,216

[22] Filed: Dec. 9, 1991

Related U.S. Application Data

[63] Continuation-in-part of Ser. No. 546,428, Jun. 29, 1991, Pat. No. 5,093,999.

[51] Int. Cl.[5] .............................................. B26B 19/04
[52] U.S. Cl. .................................... 30/223; 30/216; 30/224; 30/241
[58] Field of Search ................ 30/208, 228, 241, 223, 30/224, 210, 216

[56] References Cited

U.S. PATENT DOCUMENTS

| | | | |
|---|---|---|---|
| 3,161,954 | 12/1964 | Riley, Jr. et al. | 30/224 |
| 4,216,582 | 8/1980 | Paule et al. | 30/223 X |
| 4,619,045 | 10/1986 | Mayer | 30/223 X |
| 5,075,972 | 12/1991 | Huang | 30/223 X |

*Primary Examiner*—Frank T. Yost
*Assistant Examiner*—Kenneth Peterson
*Attorney, Agent, or Firm*—Robert L. Harrington

[57] ABSTRACT

A hedge cutting bar is shown and described as having rivets for securing a cutting blade between a retaining blade and a stationary blade. The rivet structure includes a central flange and distal hubs whereby the central flange may occupy slots in the cutting blade while the hubs attach within respective mounting apertures of the stationary blade and the retaining blade. The thickness of the flange is greater than the thickness of the cutting blade whereby a gripping force provided by the rivet is taken up at the flange to avoid pinching of the cutting blade between the stationary blade and the retaining blade. The described fastening arrangement is less suspectable to loosening under the vibrational forces imposed during use of the hedge cutting bar than that of prior fastening arrangements.

4 Claims, 2 Drawing Sheets

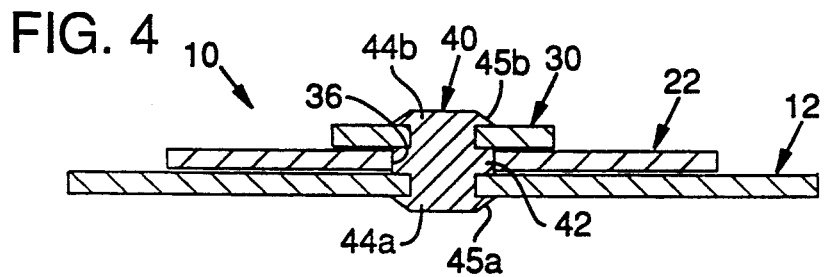
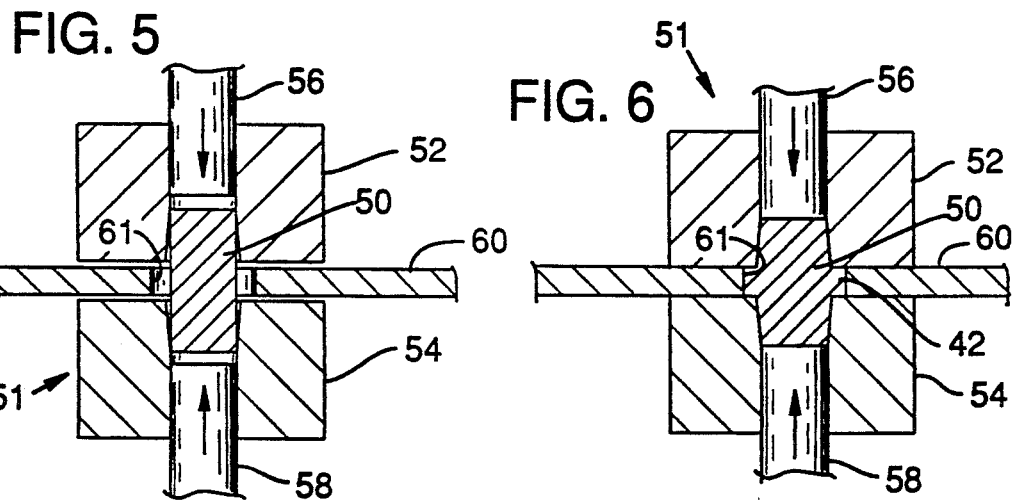
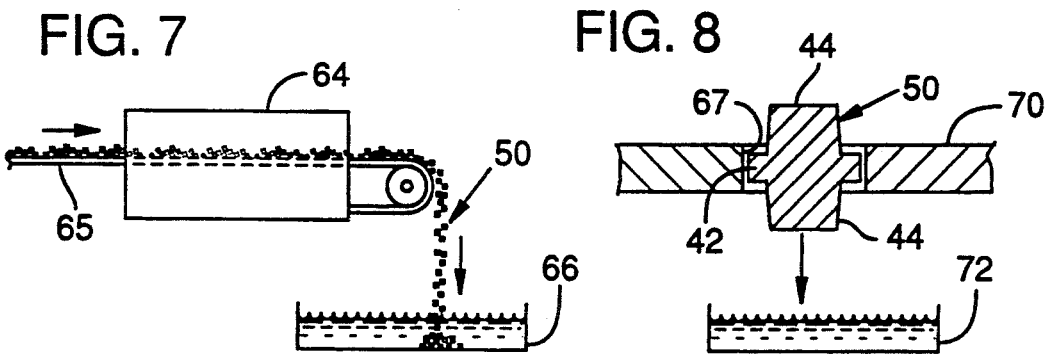
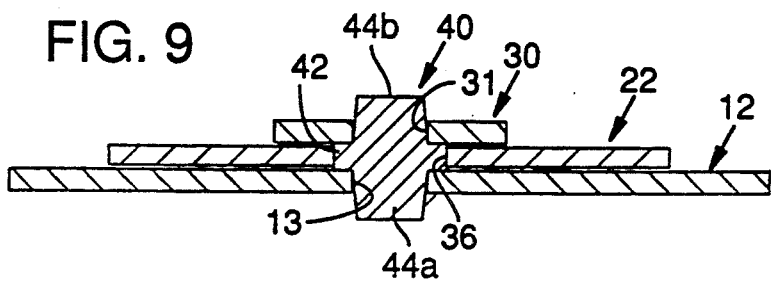

RIVET CONNECTOR FOR HEDGE CUTTING BLADE

RELATED APPLICATIONS present application is a continuation-in-part of copending application Ser. No. 07/546,428 filed Jun. 29, 1991 by Raetz et al and assigned in common to the assignee of the present invention. The disclosure of U.S. patent application Ser. No. 7/546,428 is incorporated herein in its entirety by reference.

BACKGROUND OF THE INVENTION

The present invention relates generally to a cutting apparatus and particularly to a rivet connection for a hedge cutting blade.

A hedge or brush cutting bar generally includes four basic components: a stationary blade, a movable cutting blade, a retaining blade, and a fastening mechanism for holding the retaining blade in position to suitably allow reciprocating movement of the cutting blade as captured between the stationary blade and retaining blade.

The stationary blade component attaches to the cutting device and includes a series of notches along its length. The movable cutting blade includes a corresponding series of notches along its length and lies in face to face relation to the stationary blade. By aligning the notches of the stationary and cutting blades, work pieces to be severed may be positioned within the severing space of the aligned notches of the stationary blade and the cutting blade. By reciprocating the cutting blade relative to the stationary blade, work pieces captured within the corresponding notches are severed as the notch edges slide in scissor like fashion. In this manner, hedge or brush material may be trimmed by moving the cutting bar through the body of the hedge.

The retaining blade component of the hedge cutting bar holds the reciprocating blade against the stationary blade. The reciprocating cutting blade is then captured between the stationary blade and the retaining blade. The fastening mechanism holds the retaining blade in position while suitably allowing reciprocal movement of the cutting blade. Such fastening means have previously been nut and bolt arrangements or straight sided rivets interconnecting the retaining blade and stationary blade, and passing through slots in the reciprocating cutting blade. The slots lie along the longitudinal axis of the cutting blade whereby reciprocal movement of the cutting blade is unencumbered by the bolt inserted therethrough. Also, spacing rings have been positioned within the slots to receive the bolts or rivets and allow the fastening arrangement to be tightened with sufficient force to secure the structure, but not pinch the cutting blade between the stationary blade and the retaining blade. More particularly, the spacer rings are thicker than the cutting blade so as to accept the tightening pressure of the nut and bolt rivet assemblies without restricting movement of the cutting blade.

Such hedge cutting devices operate at a high rate of reciprocation and are typically applied to hardy work material. Accordingly, the cutting blades experience great vibrational forces in severing such work pieces. The above-described fastening arrangement, i.e., nut, bolt or rivet and spacer assemblies, have proven successful, but only to a limited extent. The nut and bolt assemblies can loosen under the vibrational and operational forces imposed upon the hedge cutting bar. Such loosening requires operator monitoring and possibly intermittent tightening of the nut and bolt assemblies. While lock washers have been used to prevent the loosening, hedge cutting devices remain suspectable to this deficiency.

A second problem encountered with use of such spacer rings within the slots of the cutting blade relates to the manufacture of suitable spacer rings. More particularly, it is important that the set of spacer rings used in a given cutting blade be consistent in thickness. It is desirable that the spacer rings be slightly thicker than the thickness of the cutting blade, but when spacer rings have inconsistent thickness it is necessary to oversize the thickness of the spacer rings in order to avoid the undesirable pinching of the cutting blade between the retaining blade and the stationary blade. If the spacer rings are too thick poor cutting action results. Manufacture of spacing rings can include a preliminary manufacturing step wherein the body of the spacer ring is formed and a secondary step bringing the spacer ring into final, precise dimension. While such manufacturing methods might provide spacing rings of suitable, i.e., precise, thickness, the additional manufacturing steps requiring precise final dimensioning add to the cost of manufacture.

Accordingly, it would be desirable to provide a fastening mechanism for a hedge cutting device which suitably captures the reciprocating cutting blade between a stationary blade and a retaining blade while not unduly restricting movement of the cutting blade and not of inordinate manufacturing expense. The subject matter of the present invention provides such a fastening mechanism.

SUMMARY OF THE INVENTION

A preferred embodiment of the present invention is a fastening mechanism for a hedge cutting bar compromising a plurality of rivets, each having upper and lower hubs and an intermediate flange of greater diameter relative to the hubs. The intermediate flange is of slightly greater thickness than that of the reciprocating cutting blade.

In fastening the assembly of retainer blade, cutting blade and stationary blade, the flange is positioned within the slots of the cutting blade and the two hubs extend into corresponding apertures of the retaining blade and stationary blade, respectively. By spinning the heads of the rivets into place to secure the retaining blade and stationary blade against the central flange, the cutting blade is free to reciprocate relative to the rivets because the flange takes up the fastening pressure holding the assembly together. The use of a one piece rivet structure in accordance with the present invention provides a hedge cutting bar which is more precisely manufactured and less suspectable to loosening under operational vibrations as was found in conventional multipiece fastening mechanisms such as nut, bolt and spacer or as rivet and spacer assemblies.

The subject matter of the present invention is particularly pointed out and distinctly claimed in the concluding portion of this specification. However, both the organization and method of operation of the invention, together with further advantages and objects thereof, may be best understood by reference to the following description taken with the accompanying drawings wherein like reference characters refer to like elements.

BRIEF DESCRIPTION OF THE DRAWINGS

For a better understanding of the invention, and to show how the same may be carried into effect, reference will now be made, by way of example, to the accompanying drawings in which:

FIG. 4 is a sectional view as taken along lines 4—4 of FIG. 2 showing the hedge cutting bar assembly and a rivet component of the fastening mechanism according to the present invention.

FIGS. 5-8 show formation and heat treatment of a rivet component of the fastening mechanism of the present invention.

FIG. 9 shows construction of the cutting bar assembly using the rivet component according to the present invention.

DETAILED DESCRIPTION OF THE PREFERRED EMBODIMENT

Figure 1:
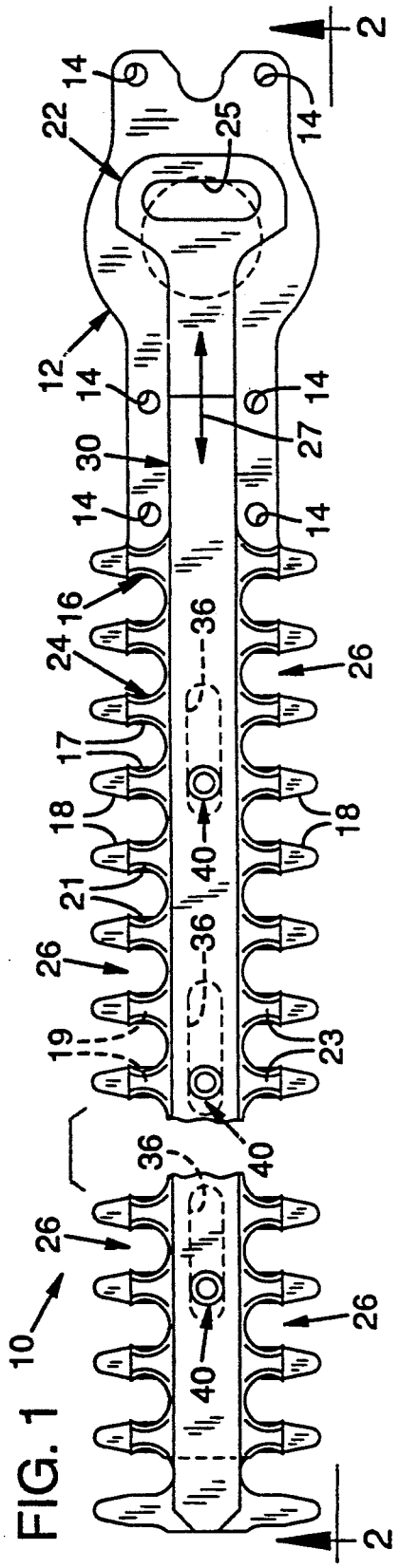
FIG. 1 is a top view of a hedge cutting bar assembly incorporating a fastening mechanism according to the present invention.
Figure 2:
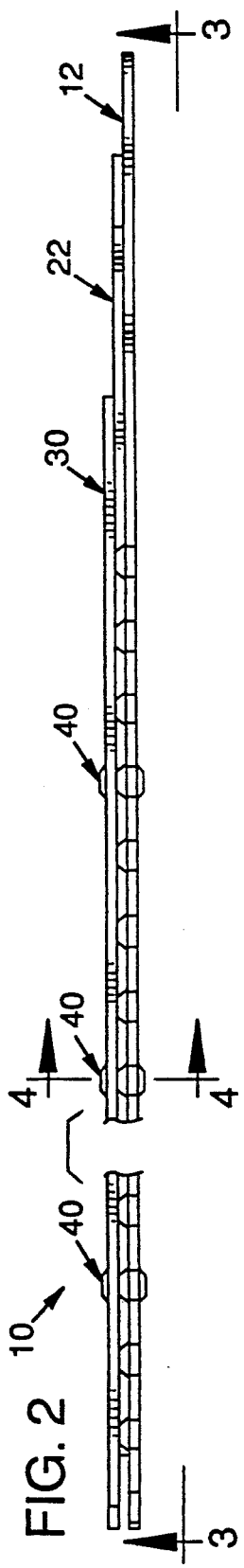
FIG. 2 is a side view of the hedge cutting bar assembly of FIG. 1 as taken along lines 2—2 of FIG. 1.
Figure 3:
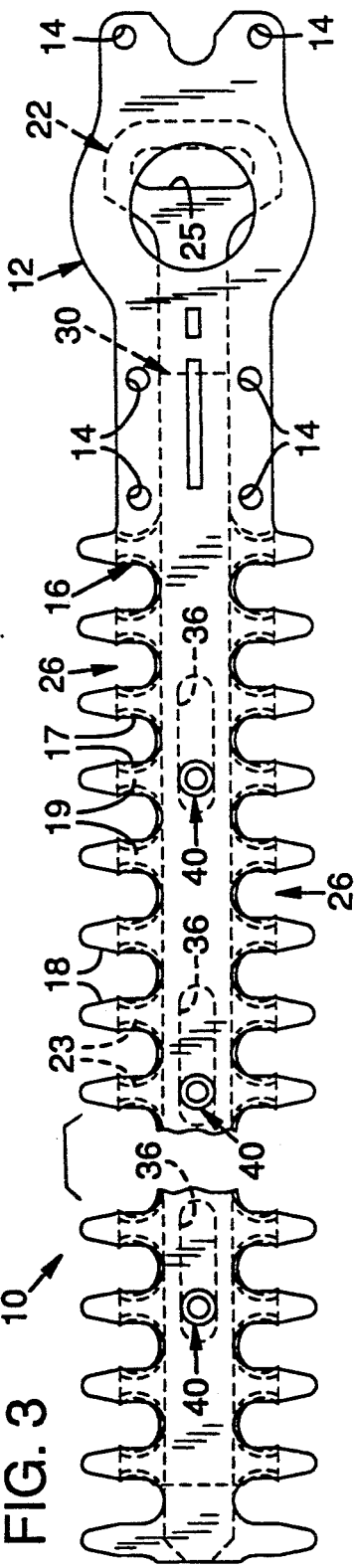
FIG. 3 is a bottom view of the hedge cutting bar assembly as taken along lines 3—3 of FIG. 2.

FIGS. 1-4 illustrate a hedge cutting bar 10 according to a preferred embodiment of the present invention. FIG. 1 is a top view of the hedge cutting bar, FIG. 2 is a side view of the assembly, FIG. 3 is a bottom view of the assembly, and FIG. 4 is a sectional view showing a fastening arrangement for securing the assembly.

In FIGS. 1-4, the hedge cutting bar 10 includes a stationary blade 12 having mounting apertures 14 for attachment to the body of a hedge outting device power head (not shown) making use of bar 10. Stationary blade 12 also includes a series of notches 16 defining cutting edges 17 of stationary blade 12. The inlet to each notch 16 is defined by a pair of guide points 18. The structure of stationary blade 12 supporting the guide points 18 and lying intermediate of each notch 16 is a stationary tooth 19 carrying the cutting edges 17.

A cutting blade 22 lies in direct face-to-face relation to stationary blade 12. Cutting blade 22 includes a corresponding series of notches 24 corresponding to the notches 16 of stationary blade 12. Cutting blade 22 includes an engagement aperture 25 adapted for receiving a reciprocating drive component of the power head (not shown) for movement of cutting blade 22 as indicated by double-headed arrow 27 of FIG. 1. The structures of cutting blade 22 defining the notches 24 are cutting teeth 23. The cutting edges 21 defining the notches 24 are beveled and slide over the cutting edges 17 of stationary blade 12. As shown in FIGS. 1 and 3, the notches 16 and 24 of blades 12 and 22, respectively, may be aligned to define severing spaces 26 of bar 10. As the cutting blade 22 reciprocates relative to stationary blade 12 the severing spaces 26 close and open, and the blades 12 and 22 cut the work piece therein in scissor-like fashion.

A more detailed description of hedge cutting bars generally is available in the above-referenced U.S. patent application Ser. No. 07/546,428 previously incorporated herein by reference.

A retaining blade 30 secures the cutting blade 22 in face-to-face relation to the stationary blade 12. More particularly, the cutting blade 22 is captured between the stationary blade 12 and retaining blade 30, but must be permitted reciprocating motion along its longitudinal axis to execute the above-described work piece cutting. Accordingly, cutting blade 22 includes longitudinally oriented slots 36 along its length. A corresponding sequence of rivets 40 occupy the slots 36, couple the stationary blade 12 and retaining blade 30, and capture the cutting blade 22 between blades 12 and 30. The rivets 40 of the preferred embodiment are generally the same type of rivets as used in saw chains, but adapted primarily in dimension for application in brush cutting blades in accordance with the present invention.

FIG. 4 illustrates in greater detail the structure of rivets 40 as used to secure the blade assembly. In FIG. 4, a rivet 40 includes a central flange 42 and at each end a hub 44 individually numbered 44a and 44b. The flange 42 is of greater diameter than the hubs 44. The diameter of flange 42 corresponds to the width of slots 36 in cutting blade 22 but is slightly smaller as required for insertion and relative sliding thereof in the slot. The thickness, or height as seen in FIG. 4, of flange 42 corresponds to the thickness of cutting blade 22, but is slightly greater to avoid pinching of blade 22 between retaining blade 30 and stationary blade 12.

In the preferred embodiment of the present invention, the cutting blade 22 is captured between the retaining blade 30 and stationary blade 12 to such extent that a minimal moving force is required to initiate sliding action of cutting blade 22. In this regard, the thickness of flange 42 is sufficient to provide approximately 0.005 inches clearance for cutting blade 22 within the space between blades 12 and 30.

FIGS. 5 and 6 illustrate in cross-section the manufacture of the rivets 40. In FIGS. 5 and 6, a soft, e.g., a hardness of RB 88, rivet blank or wire 50 is positioned within a rivet forming header 51. Header 51 includes an upper sleeve 52 and a lower sleeve 54. An upper plunger 56 moves slidably within the sleeve 52 and a lower plunger 58 moves slidably within the sleeve 54. A plate 60 is positioned intermediate of the sleeves 52 and 54 and includes an aperture 61 therein through which the rivet blank 50 rests. An upper end of rivet blank 50 rests within the sleeve 52 and a lower end of the rivet blank 50 rests within the sleeve 54.

FIG. 6 illustrates the condition of header 51 and rivet blank 50 following actuation of the header 51. More particularly, the upper and lower sleeves 52 and 54 have come together and against the plate 60. The plungers 56 and 58 are driven toward one another. As a result of such movement of the components of header 51 the rivet blank 50 is deformed into such configuration as to define the hubs 44 and flange 42. As shown in FIGS. 5 and 6, the hubs 44 have a slight frusto-conical shape. The rivet blank 50 is removed from header 51 by expansion of header 51 and actuation of one of plungers 56 and 58 to push the rivet blank 50 out of header 51.

In FIG. 7, the entire body of each rivet blank 50 is heat treated to a suitable hardness for allowing turning of the hubs 44 to form the rivet heads 44a and 44b (FIG. 4). Thus, in FIG. 7 rivet blanks 50 pass through oven 64 on conveyor 65 and drop into cooling bath 66. Following heat treatment of the entire body of each rivet blank 50, the flange 42 is heat treated to a greater hardness to provide a bearing function of flange 42 within the slots 36. In FIG. 8, the rivet blank 50 passes through the aperture 67 of an induction coil 70 for selectively heating the flange 42 to a greater temperature than hubs 44. The rivet blanks 50 then drop into a cooling bath 72. In this manner, the flange 42 may be provided with a greater hardness than that of the hubs 44. This is important because the flange 42 must provide a bearing function within the slots 36 of cutting blade 42 and for that reason must be relatively hard. The hubs 44, however, must be soft enough to allow for spinning in the formation of rivet heads 44a and 44b (FIG. 4).

Rivet blank 50 formation and heat treatment is illustrated schematically in FIGS. 5-8, it being understood that such processes are known for formation and heat treatment of rivets used in saw chains.

FIG. 9 illustrates placement of the rivet 40 within the assembly of stationary blade 12, cutting blade 22 and retaining blade 30. In may be appreciated that, given the frusto-conical structure of the hubs 44 at this stage, the arrangement illustrated in FIG. 9 may be accomplished by first inserting the lower hub 44a through the rivet aperture 13 of stationary blade 12 with the cutting blade 22 resting upon blade 12 so as to position the flange 42 within the slot 36 of cutting blade 22. The retaining blade 30 is then positioned above cutting blade 22 to position the upper hub element 44b within the rivet mounting aperture 31 of retaining blade 30 and capture flange 42 within slot 36. The rivet hub 44a and 44b are then headed, e.g., spun to form rivet heads 45a and 45b in accordance with known practice to engage the retaining blade 30 and stationary blade 12 against the flange 42 of rivets 40. In this manner, the cutting blade 22 is slidably mounted upon the assembly with freedom of reciprocation according to the movement of flanges 42 within slots 36 of cutting blade 22.

It should be appreciated by those skilled in the art that the use of a rivet structure as shown herein serves the objective of securing the hedge cutting bar assembly to permit reciprocation of the cutting blade 22, but is less suspectable to the tremendous vibrational forces imposed upon the bar in operation. More particularly, in prior bars, the retaining blade and stationary blade were secured by means of nut, bolt and spacer fastening arrangement, but such fastening arrangements were suspectable to loosening when exposed to operational forces. The fastening arrangement of the present invention, therefore, provides a maintenance free means of fastening arrangement for a hedge cutting bar assembly which withstands the vibrational forces imposed, but without requiring intermittent monitoring and tightening by the operator.

It may be further appreciated that manufacture of the fastening arrangement using rivets 40 with acceptable thickness tolerances for flanges 42 is less expensive than that required to produce a corresponding nut, bolt, and spacer arrangement, or straight sided rivet and spacer arrangement, with acceptable thickness tolerances for the spacer.

It will be appreciated that the present invention is not restricted to the particular embodiment that has been described and illustrated, and that variations may be made therein without departing from the scope of the invention as found in the appended claims and equivalence thereof.

What is claimed is:

1. A hedge cutting bar comprising:
   an elongate stationary blade adapted for attachment to a hedge cutting device power head, the stationary blade defining a periphery and including a plurality of notches at its periphery and further including a plurality of fastening apertures;
   an elongate retaining blade having a plurality of fastening apertures corresponding to the plurality of fastening apertures of the stationary blade and positioned for alignment therewith when the stationary blade and retaining blade are positioned in opposed relationship;
   an elongate cutting blade having a defined thickness and being adapted for attachment to a reciprocating element of a hedge cutting device power head and defining a periphery including a plurality of notches at its periphery corresponding to the plurality of notches of the stationary blade whereby the stationary blade and the cutting blade are positioned in face-to-face contacting relation for alignment of the corresponding notches to define severing openings which open and close upon reciprocation of the cutting blade relative to the stationary blade, the cutting blade having a plurality of elongate slots corresponding to the plurality of fastening apertures of the stationary blade and the retaining blade, each slot being oriented in parallel relation to the longitudinal axis of the cutting blade;
   a plurality of rivets corresponding to the plurality of fastening apertures of the stationary blade and the retaining blade and each rivet being an integral part that is configured to the width of the slots and a thickness greater than the thickness of the cutting blade, each rivet having a pair of distal hub formations being engaged within the corresponding fastening apertures of the stationary blade and the retaining blade, each of said hubs being headed to permanently secure the cutting blade between the stationary blade and the retaining blade while allowing reciprocating movement of the cutting blade.

2. A hedge cutting bar comprising:
   a stationary blade including fastening apertures;
   an elongate cutting blade having a defined thickness including slot apertures having a defined width and being parallel to the blade's longitudinal axis;
   a retaining blade including fastening apertures; and
   a plurality of rivets each formed into a configured integral fastener having a central flange and first and second end hubs, said flange having a greater diameter than said end hubs and greater than said fastening apertures, the first and second end hubs projected through the fastening apertures of the stationary blade and retaining blade, respectively, each of the projected ends of the hubs being headed to permanently secure the stationary blade, cutting blade and retaining blade together, the flanges of the plurality of rivets having a common thickness that is greater than the thickness of the cutting blade, the flanges being slidably positioned within the slot apertures of the cutting blade whereby the retaining blade and stationary blade bear against the flanges of the rivets for securely capturing the cutting blade between the stationary blade and the retaining blade while allowing reciprocal movement of the cutting blade along its longitudinal axis.

3. A hedge cutting bar according to claim 2 wherein the diameter of said flanges corresponds to the width of the slots.

4. A hedge cutting bar according to claim 3 wherein said flanges have a hardness that is greater than the hardness of said end hubs for reducing wear of said flanges in sliding engagement with said slot apertures of said cutting blade.

* * * * *

UNITED STATES PATENT AND TRADEMARK OFFICE
CERTIFICATE OF CORRECTION

PATENT NO. : 5,153,996
DATED : October 13, 1992
INVENTOR(S) : Kuzarov et al

It is certified that error appears in the above—identified patent and that said Letters Patent is hereby corrected as shown below:

Column 6, line 24 should read as follows:

that is configured to have a central flange with a
diameter corresponding to the width of the slots
and a Column 6, line 27 should read as follows:

tions of less diameter than the central flange, the hub
formations being engaged within the corresponding fas- Signed and Sealed this Twenty-eighth Day of September, 1993

*Attest:*

BRUCE LEHMAN

*Attesting Officer*     Commissioner of Patents and Trademarks